(12) United States Patent
Watanabe

(10) Patent No.: US 6,951,351 B2
(45) Date of Patent: Oct. 4, 2005

(54) AIRBAG

(75) Inventor: Tsuyoshi Watanabe, Fuji (JP)

(73) Assignee: Nihon Plast Co., Ltd., Shizuoka-ken (JP)

( * ) Notice: Subject to any disclaimer, the term of this patent is extended or adjusted under 35 U.S.C. 154(b) by 0 days.

(21) Appl. No.: 09/928,608

(22) Filed: Aug. 13, 2001

(65) Prior Publication Data

US 2002/0020997 A1 Feb. 21, 2002

(30) Foreign Application Priority Data

Aug. 11, 2000 (JP) ................................. P2000-244955

(51) Int. Cl.⁷ .............................................. B60R 21/16
(52) U.S. Cl. .................................................... 280/743.1
(58) Field of Search ........................... 280/743.1, 728.1

(56) References Cited

U.S. PATENT DOCUMENTS

| 5,454,594 A | * | 10/1995 | Krickl ..................... 280/743.1 |
| 5,529,340 A | * | 6/1996 | Fairbanks ................ 280/743.1 |
| 6,129,382 A | * | 10/2000 | Tonooka .................. 280/743.1 |

FOREIGN PATENT DOCUMENTS

| JP | 09099795 | 4/1997 |
| JP | 9099795 | 4/1997 |
| JP | 10315892 | 12/1998 |
| JP | 2000016210 | 1/2000 |
| JP | 2000-159049 | 6/2000 |
| JP | 10 315892 | 12/2002 |
| WO | WO 00/53460 | 9/2000 |

\* cited by examiner

*Primary Examiner*—Eric Culbreth
(74) *Attorney, Agent, or Firm*—Brenda O. Holmes; Kilpatrick Stockton LLP

(57) ABSTRACT

An airbag includes: an upper base cloth having a rear face portion, both side portions supporting the rear face portion, and an upper face portion; and a lower base cloth having a rear face portion, both side portions supporting the rear face portion, and a bottom face portion. In the construction, joining portion of the upper base cloth and joining portion of lower base cloth are joined to each other to form a bag-shaped airbag, so that two joining lines between the rear face portion of the lower base cloth and each of the both side portions of the lower base cloth are smoothly curved in such a manner that middle portions of the two joining lines project towards the occupant, thereby forming a bulging portion at the rear face portion of the lower base cloth.

1 Claim, 5 Drawing Sheets

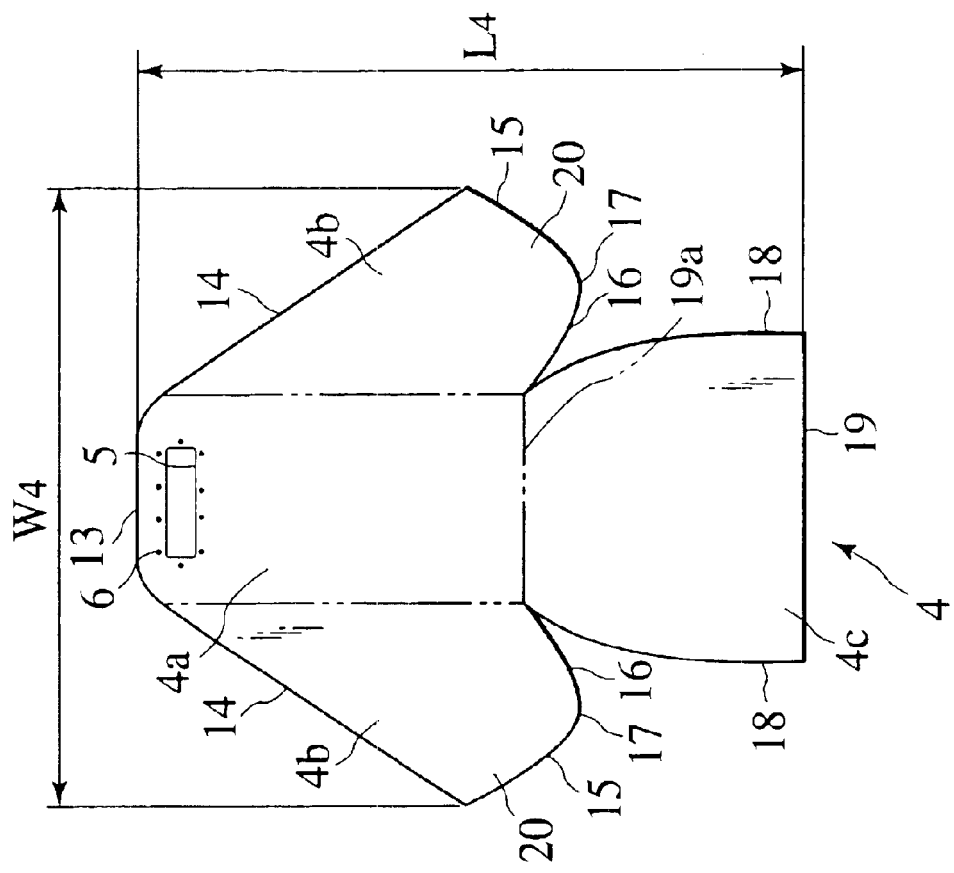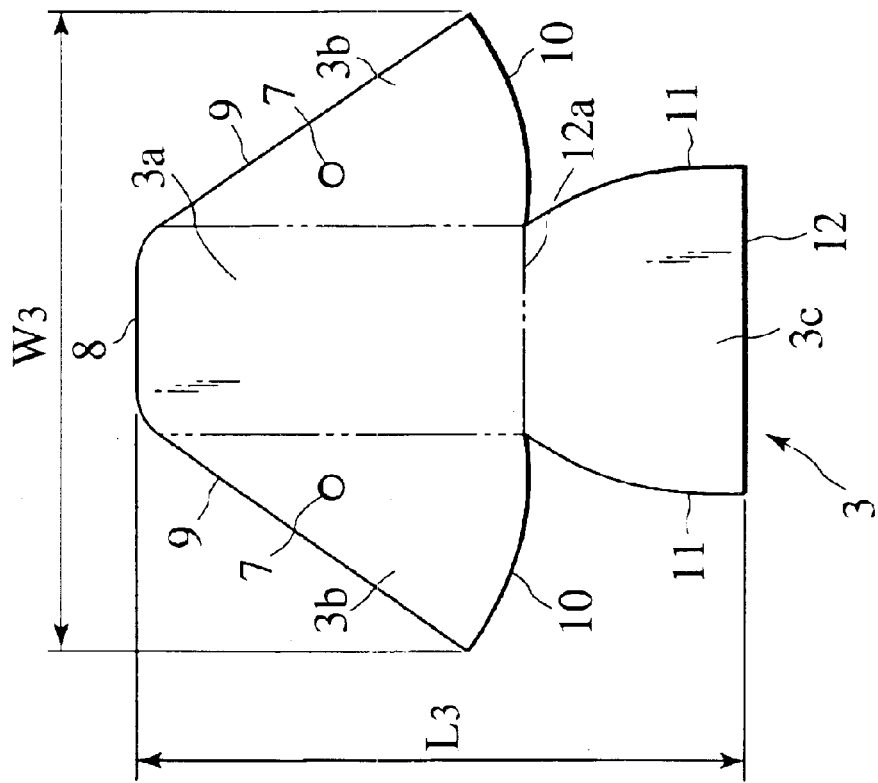

AIRBAG

BACKGROUND OF THE INVENTION

1. Field of the Invention

The present invention relates to an airbag employed in a vehicle such as an automobile, an airplane or the like, and in particular to an airbag which is formed in a 3-dimensional shape and which has a large volume optimal for a front passenger seat of an automobile.

2. Description of the Related Art

In general, an airbag apparatus is structured such that an airbag and an inflator are accommodated in a module equipped in a vehicle interior equipment: and the airbag is inflated or expanded inwards a vehicle compartment by gas ejected from the inflator to protect a vehicle occupant. As the vehicle interior equipment, there are listed a center pad of the steering wheel, an instrument panel, a door trim, a seat and the like.

Particularly, regarding an airbag for a front passenger seat, since an instrument panel and an occupant or a passenger are distanced from each other, the airbag is required to have a large volume when it is inflated and to inflate or develop in a 3-dimensional or cubic shape to protect an occupant.

As such an airbag for a front passenger seat, there is one which has been disclosed in Japanese Patent Application Laid-Open No.10-315892. This airbag has a base cloth structure comprising three base cloths of a pair of side base cloths and a main base cloth. However, in the airbag comprising three base cloths, there is a drawback that sewing work is complicated and workability is deteriorated due to increase in the number of parts and necessity of 3-demensional sewing.

In view of such a drawback, there has been proposed another airbag such as shown in FIG. 1 and as disclosed in Japanese Patent Application Laid-Open No.9-99795. An airbag as disclosed in that publication is formed such that two upper and lower base cloths (fabrics) B and C are put one on another and peripheral portions thereof are joined through sewing or the like. That arrangement has an advantage in that the number of parts is reduced and workability is improved.

In such a conventional airbag A, however, since the upper and lower base cloths B and C are set to the same shape, there is a possibility that, when the airbag A is inflated, a space or gap occurs between the inflated or expanded airbag and the abdomen H1 of a vehicle occupant H. Also, as shown in FIG. 2, there is a possibility that, when the occupant H sits on a front side seat and he/she abuts on the lower base cloth C, the airbag A is pressed by the breast H2 of the occupant H to be displaced in a direction G.

SUMMARY OF THE INVENTION

The present invention has been achieved with such points in mind.

It therefore is an object of the present invention to provide an airbag which can protect the abdomen of an occupant securely.

It is another object of the present invention to provide an airbag whose joining workability is improved owing to structure using a small amount of simple base cloth.

It is still another object of the present invention to provide an airbag whose manufacturing cost is inexpensively reduced.

To achieve the objects, according to a first aspect of the present invention, there is provided an airbag formed by joining two base cloths constituting an upper piece and a lower piece to form substantially closed box like shape, comprising: an upper base cloth having a first rear face portion opposed to an occupant of a vehicle in an inflated state of the airbag, an upper face portion continuously and substantially perpendicularly disposed with the first rear face portion and two first side portions each connected to the first rear face portion and the upper face portion so that the upper piece is formed in generally box like shape, wherein the upper piece comprises an upper joining line defied between the first rear face portion and the first side portion; and a lower base cloth having a second rear face portion opposed to the occupant in the inflated state of the airbag, a lower face portion continuously and substantially perpendicularly disposed with the second rear face portion and two second side portions each connected to the second rear face portion and the lower face portion so that the lower piece is formed in generally box like shape, wherein the lower piece comprises a lower joining line defined between the second rear face portion and the second side portion, wherein the lower joining line is smoothly curved in such a manner that middle portion of the joining line projects toward the occupant, thereby forming a bulging portion at the second rear face portion.

Alternatively, as a second aspect, it is applicable that the lower joining line is smoothly projected outwardly in its middle portion, thereby forming a bulging portion at the second rear face portion.

According to a third aspect of the invention, as it depends from the first aspect, there is provided an airbag wherein the lower joining line has an arc shape portion smoothly integrated therein.

According to a fourth aspect of the invention, as it depends also from the first aspect, wherein the lower joining line has a plurality of arc shape portions in which each adjacent two arc shape portions have different radii and join smoothly with each other.

According to the above aspects, since a volume of the lower base cloth abutting on the abdomen of an occupant of a vehicle can be increased, safety to the occupant can be improved. Furthermore, since the airbag is simply structured by two base cloths and it is unnecessary to change the lengths of the joining portions of the upper and lower base cloths, the joining work of the upper and lower base cloths can be performed in the conventional manner so that workability is excellent and manufacturing cost can be reduced.

Furthermore, since the budging portion is formed by the arc shape portion or by continuous arcs which are smoothly joined with each other, a surface contour of the bulging portion can be formed smoothly, thereby improving safety.

BRIEF DESCRIPTION OF THE ACCOMPANYING DRAWINGS

The above and further objects and novel features of the present invention will more fully appear from the following detailed description when the same is read in conjunction with the accompanying drawings, in which:

FIGS. 4A and 4B are plan view showing respective base cloths shown in FIG. 3;

DETAILED DESCRIPTION OF THE PREFERRED EMBODIMENT

Figure 1:
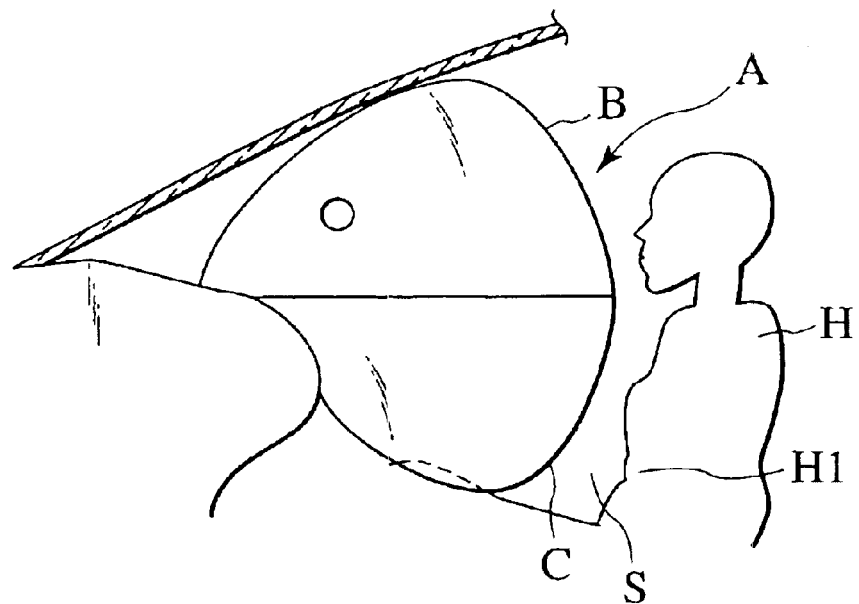
FIG. 1 is a side view showing an inflated state of a conventional airbag.
Figure 2:
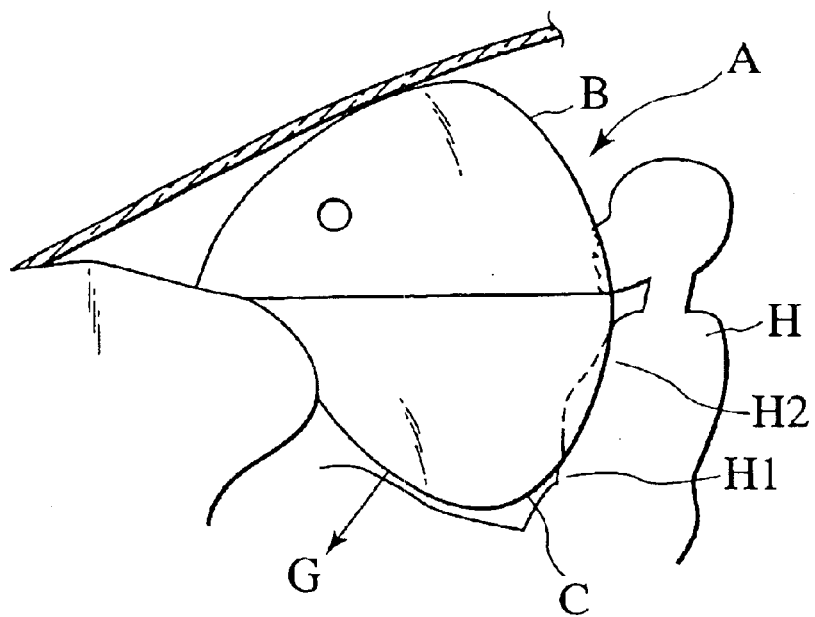
FIG. 2 is a side view showing a state where the airbag shown in FIG. 1 abuts on an occupant of a vehicle.
Figure 3:
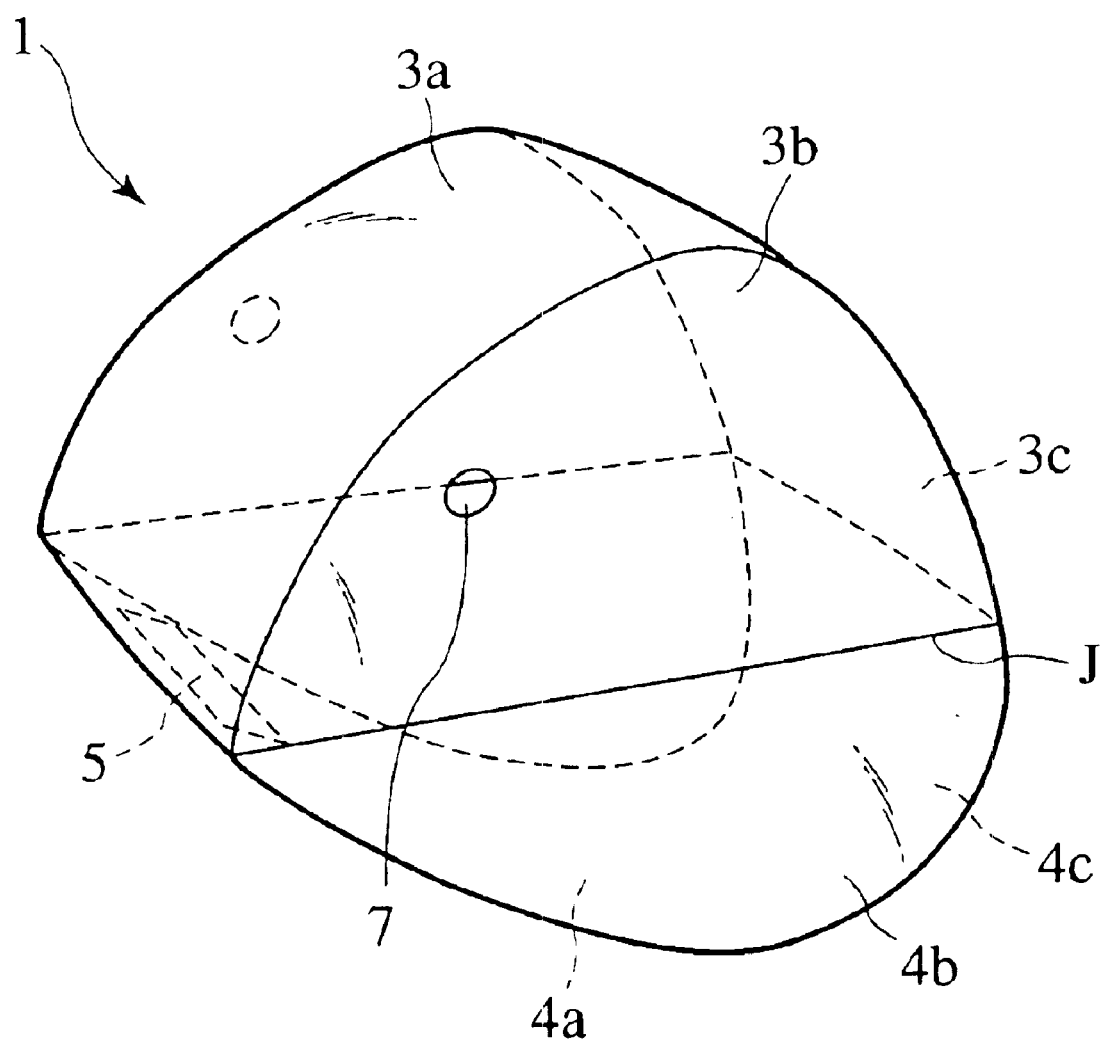
FIG. 3 is a perspective view showing an inflated state of an airbag of an embodiment according to the present invention.

A preferred embodiment of the present invention will be explained below with reference to FIGS. 3 to 6.

An airbag 1 according to this embodiment is an airbag for a front passenger seat equipped in an instrument panel 2 positioned below a front window panel or windshield glass W. This airbag 1 is constituted by two non-coated base cloths (base fabrics) 3 and 4 made from nylon 66 fabric having weight of 200 g/m$^2$.

Shapes of the base cloths 3 and 4 prepared will be explained with reference to FIGS. 4A and 4B. In FIGS. 4A and 4B, upper sides of the cloths are positioned on a front side of a vehicle and mounted in an instrument panel 2, and lower sides thereof are positioned on a rear side of the vehicle and opposed to an occupant or passenger H of the vehicle.

The base cloth 3 is positioned on an upper side, and it is formed generally symmetrically, where generally triangular side portions 3b are formed on both sides of a rectangular upper face portion 3a and a generally arcuate-sided rear face portion 3c is formed on one side of the rear end of the upper face portion 3a. Vent holes 7 for discharging gas after inflation of the airbag are formed at boundary portions between the upper face portion 3a and both side portions 3b.

The full width W3 of the base cloth 3 is 1100 mm, the full length thereof L3 is 1015 mm, and the length of each oblique side 9 is 680 mm. The length of a side 8 is 330 mm, the length of a side 12 is 550 mm, and sides 10 are formed in an arc having a radius of 500 mm.

The base cloth 4 is positioned on a lower side, and it is formed generally symmetrically, where a generally rectangular side portions 4b are formed on both sides of a rectangular bottom face portion 4a, and a generally rectangular rear face portion 4c is formed on one side of a rear end of the bottom face portion 4a. A gas introducing hole 5 is formed adjacent to a front end of the bottom face portion 4a and an inflator (not shown) is connected to the gas introducing hole 5 so that gas can be introduced into the airbag. Small holes 6 through which bolts of a retainer (mounting member) for mounting the airbag 1 to a reaction canister are inserted and are formed at a periphery of the gas introducing hole 5. Reinforcing cloth (not shown) is sewn at peripheral portions of the gas introducing hole 5 and small holes 6 so that the peripheral portions are reinforced.

The full width W4 of the base cloth 4 is 1100 mm, the full length L4 thereof is 1110 mm, and the length of each oblique side is 680 mm. The length of a side 13 is 330 mm, and the length of a side 19 is 550 mm. Sides 15 and 16 constituting the bulging portion 20 are respectively formed by an arc having a radius of 500 mm and a side 17 is formed by an arc having a radius of 100 mm. Since the bulging portion 20 is constituted by continuous arcs of three sides, a surface contour of the bulging portion 20 abutting on the abdomen of the occupant H can be formed smoothly, thereby improving safety.

In the base cloths 3 and 4, as shown in FIGS. 4A and 4B, the upper face portion 3a and the bottom face portion 4a have the same shape, and a line extending from the side 8 to the slope side 9 and a line extending from the side 9 to the slope side 14 have the same shape, but the connection shape between each side portion 3b and the rear face portion 3c, and the connection shape between each side portion 4b and the rear face portion 4c, are different from each other, and correspondingly the shapes of the rear face portions 3c and 4c are different from each other.

Next, the process for sewing the base cloths 3 and 4 to manufacture the airbag 1 will be explained. In the base cloths 3 and 4, since the full widths W3 and W4 are the same and the lengths and the inclination angles of the slope side 9 are the same as those of the slope side 14, the upper halves of the base cloths 3 and 4 are coincident with each other when the base cloths 3 and 4 are put one on another. The three sides of both the slope sides 9 and 14 and the sides 8 and 13 of the base cloths 3 and 4 are sewn. For example, the sewing work is performed so as to form stitches of the needle handling number of 3.5/cm using 8 number count yarn of nylon 66 with 21 number count sewing-machine needle. Incidentally, the conditions of the sewing work explained below are the same as this work. Next, when the side 12 and the side 19 are put one on another and are sewn, the base cloths 3 and 4 are respectively formed in a box shape.

Next, the joining portions 8, 9 and 12 of the box-shaped base cloth 3 and the joining portions 13, 14 and 19 of the box-shaped base cloth 4 are sewn to form a bag-shaped airbag 1. The side 12a of the base cloth 3 is picked up, and the side 10 and the side 11 are put one on another and they are sewn. Further, after reversion, the side 19a is picked up and the sides 15, 16, 17 and the side 19 are put one on another and they are sewn. Finally, inside and outside are reversed through the gas introducing opening 5 and the sewing work is finished. A joining line J extending along front and rear directions appears on a central portion between the side portions 3b and 4b. Thus, since the airbag with a 3-dimensional shape can be formed by such a simple work that two base cloths 3 and 4 are put one on another and they are sewn, sewing workability can be improved significantly.

Figure 5:
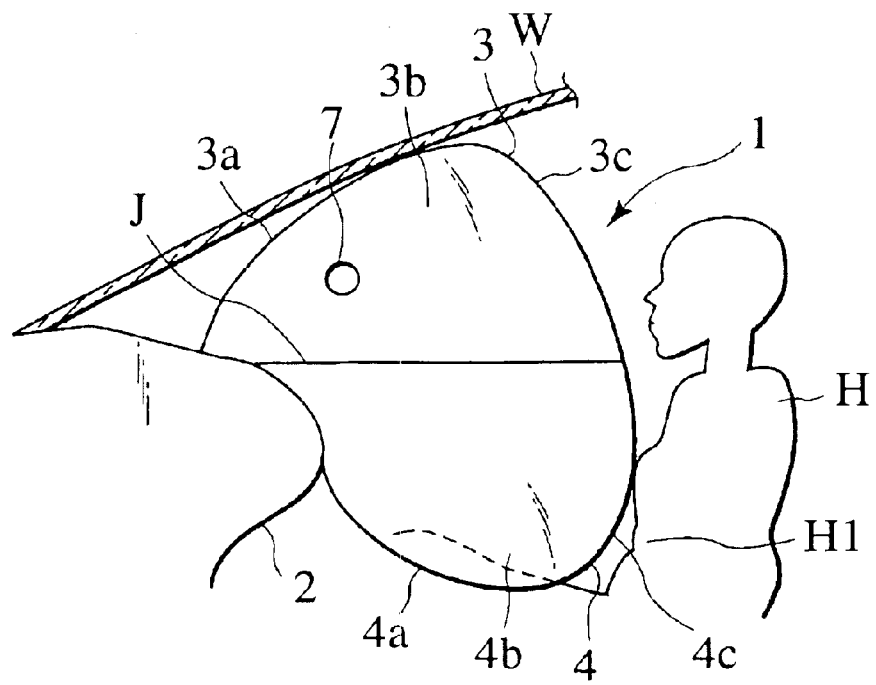
FIG. 5 is a side view showing an inflated state of the airbag shown in FIG. 3.
Figure 6:
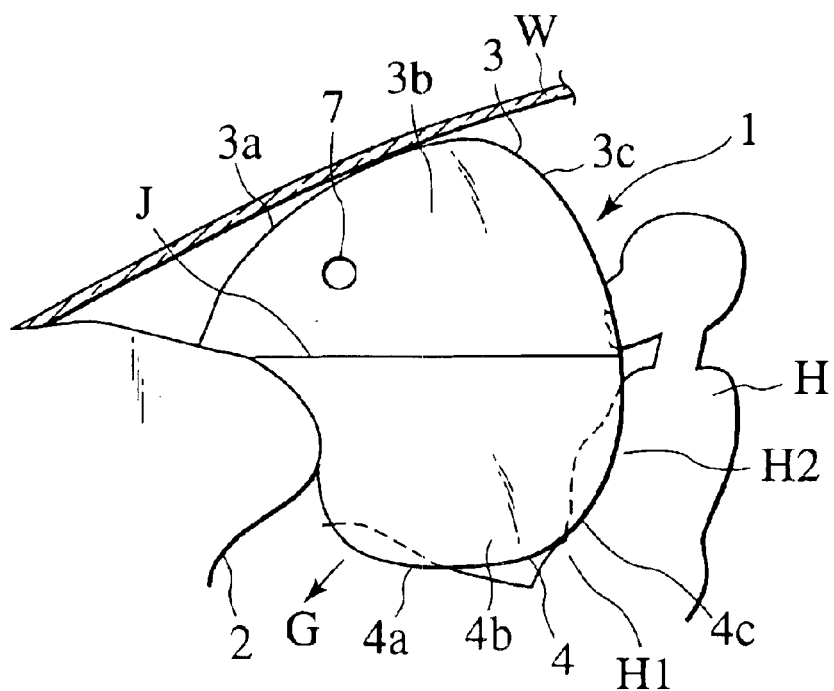
FIG. 6 is a side view showing a state where the airbag shown in FIG. 5 abuts on an occupant of a vehicle.

When the airbag 1 thus formed is inflated as shown in FIG. 5, the volume of the portion of the airbag 1 corresponding to the abdomen H1 of the occupant H is increased, so that the displacement in the G direction can considerably be reduced, as shown in FIG. 6.

Figure 7:
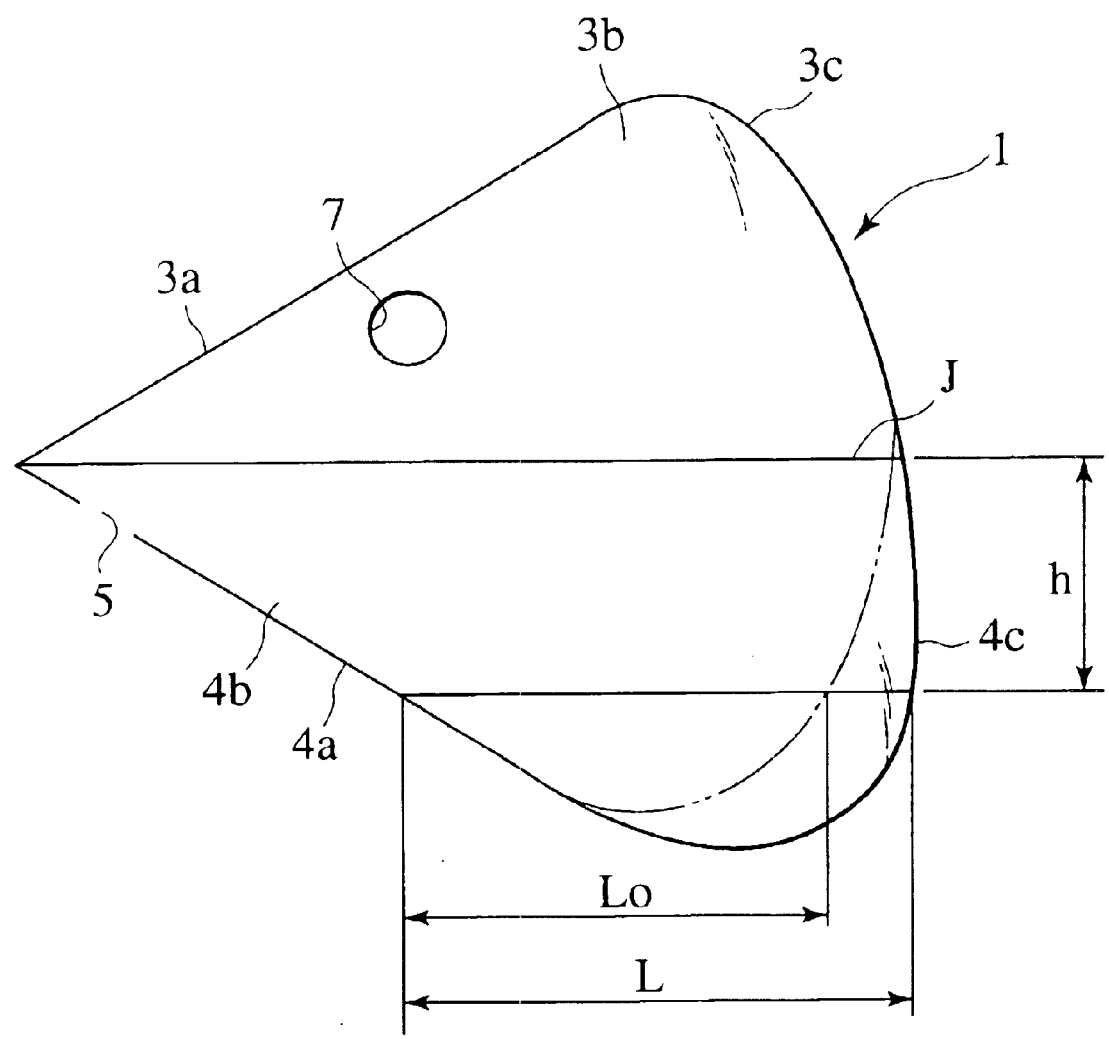
FIG. 7 is a side view showing a difference between the inflated state of the airbag of the embodiment according to the present invention and the inflated state of the airbag according to the conventional structure.

FIG. 7 shows a comparison of the side shapes of the airbag of the embodiment according to the present invention and the conventional airbag, where, in the portion of the inflated airbag positioned from the joining line J between the side portions 3b and 4b downward by length h (200 mm), the length thereof to the rear face portion 3c or 4c is 330 mm in the conventional airbag (L0) and that is 420 mm in the present embodiment (L), so that the distance from the inflated airbag to the abdomen H1 of the occupant H can be reduced as much as 27% in this embodiment.

The entire contents of Japanese Patent Application P2000-244955 (filed on Aug. 11, 2000) are incorporated herein by reference.

Although the invention has been described above by reference to certain embodiments of the invention, the invention is not limited to the embodiments described above. Modifications and variations of the embodiments described above will occur to those skilled in the art, in light of the above teachings. For example, although the joining line in the above described embodiment includes three circular arcs (arc shape portions) which are smoothly joined with each others, two straight lines inserted with circular arcs therebetween which are smoothly joined with each other or parabola of which radius continuously varies are also applicable for the joining line according to the invention. The scope of the invention is defined with reference to the following claims.

What is claimed is:

1. An airbag for employment in a vehicle to protect a vehicle occupant facing the airbag, the airbag comprising:

an upper bag portion (3) having an upper rear surface (3c) which cushions generally against the face of the vehicle occupant (H) as the airbag is inflated; and a lower bag portion (4) joined together with the upper bag portion (3) to form the airbag (1), the lower bag portion (4) having a lower rear surface (4c) which extends rearwardly of the upper rear surface to cushion generally against an abdomen (H1) of the vehicle occupant (H), wherein a left end of the lower rear surface (4c) is joined with a left side portion (4b) by a left joining line including a plurality of arc shape portions (15,17,16) which have different radii and join continuously with each other, so that the left joining line is smoothly curved;

wherein a right end of the lower rear surface (4c) is joined with a right side portion (4b) by a right joining line including a plurality of arc shape portions (15,17,16) which have different radii and join continuously with each other, so that the right joining line is smoothly curved; and wherein the volume of the lower bag portion (3) is greater than the volume of the upper bag portion (4).

* * * * *